US012712223B2

(12) United States Patent
Gao et al.

(10) Patent No.: US 12,712,223 B2
(45) Date of Patent: Aug. 18, 2026

(54) BATTERY TEMPERATURE REGULATION SYSTEM

(71) Applicant: The Boeing Company, Chicago, IL (US)

(72) Inventors: Lijun Gao, Renton, WA (US); Camron Ravell Call, St. Charles, MO (US); Shengyi Liu, Sammamish, WA (US)

(73) Assignee: THE BOEING COMPANY, Arlington, VA (US)

( * ) Notice: Subject to any disclaimer, the term of this patent is extended or adjusted under 35 U.S.C. 154(b) by 760 days.

(21) Appl. No.: 17/750,682

(22) Filed: May 23, 2022

(65) Prior Publication Data

US 2023/0378569 A1 Nov. 23, 2023

(51) Int. Cl.

| | |
|---|---|
| ***H01M 10/6572*** | (2014.01) |
| ***H01M 10/48*** | (2006.01) |
| ***H01M 10/613*** | (2014.01) |
| ***H01M 10/615*** | (2014.01) |
| ***H01M 10/63*** | (2014.01) |

(52) U.S. Cl.

CPC ..... *H01M 10/6572* (2015.04); *H01M 10/486* (2013.01); *H01M 10/613* (2015.04); *H01M 10/615* (2015.04); *H01M 10/63* (2015.04)

(58) Field of Classification Search

CPC .. H01M 10/63; H01M 10/613; H01M 10/615; H01M 10/6572

See application file for complete search history.

(56) References Cited

U.S. PATENT DOCUMENTS

2004/0135550 A1* 7/2004 Nishihata .......... H01M 10/6566 320/150
2017/0200992 A1 7/2017 Piggott et al.
2020/0156442 A1* 5/2020 Cosgrove .............. H01M 10/63
2020/0227801 A1 7/2020 Kumar
2023/0077808 A1* 3/2023 Havel ................. H01M 10/613 700/218
2023/0361384 A1* 11/2023 Ma ........................ H01M 10/63

FOREIGN PATENT DOCUMENTS

CN 111244572 A * 6/2020 .......... H01M 10/613
CN 111584971 A * 8/2020
EP 3817126 A1 5/2021
WO WO-2011138156 A1 * 11/2011 ............. H01G 11/10

OTHER PUBLICATIONS

CN111244572A translation (Year: 2020).*
CN111584971A translation (Year: 2020).*
WO2011138156 translation (Year: 2011).*
EP Search Report mailed on Oct. 4, 2023 in re EP Application No. 23173477.3.

* cited by examiner

*Primary Examiner* — Allison Bourke
*Assistant Examiner* — Travis L. Martin
(74) *Attorney, Agent, or Firm* — COATS & BENNETT, PLLC

(57) ABSTRACT

A system and method for heating and cooling a battery. The system includes a thermoelectric device configured to attach to the battery and operate in a heating mode to elevate the operating temperature of the battery and in a cooling mode to reduce the operating temperature of the battery. Control circuitry is configured to: determine a temperature of the battery; supply an input voltage and a polarity of the thermoelectric device; and adjust the input voltage and the polarity based on a temperature of the battery.

20 Claims, 8 Drawing Sheets

TO LOADS
110
101
100
+
-
POWER CONDITIONER 50
LOCAL CONTROLLER 60
40
80
20
70
10

BATTERY TEMPERATURE REGULATION SYSTEM

TECHNOLOGICAL FIELD

The present disclosure relates generally to the field of managing a battery and, more specifically to operating a battery within a temperature range.

BACKGROUND

Battery performance including rate of charge or discharge, and capacity of charge or discharge, is affected by operating temperatures. Typically, high temperatures result in faster cell aging and capacity fading that potentially lead to a thermal runaway. Low temperatures result in higher voltage drop inside the cell because of a larger equivalent internal resistance and thus lower output power capability. Use in low temperatures can result in lower useful capacity and can also limit the rate of charge or discharge due to a reduced mobility of ions and increased viscosity of electrolyte.

Typical battery thermal management systems are not designed and operated for achieving an optimum capacity and/or an optimum rate of charge and discharge. The systems include a thermal management method that cools by liquid or forced air, and heats by use of a heat exchanger and external heating. Issues with these systems is they are often bulky that reduces the contexts in which they can be used. These systems are also limited to contexts that are not sensitive to weight/volume control.

Thus, there is a need for systems configured to keep a battery in a desired temperature range during operation. Operation within the temperature range can result in better charge and discharge capacity, high power rate, lower aging rate, and higher reliability.

SUMMARY

One aspect is directed to a system for heating and cooling a battery for the battery to operate within a temperature range. The system comprises a thermoelectric device configured to attach to the battery and operate in a heating mode to elevate the operating temperature of the battery and in a cooling mode to reduce the operating temperature of the battery. Control circuitry is configured to: determine a temperature of the battery; supply an input voltage and a polarity of the thermoelectric device; and adjust the input voltage and the polarity based on a temperature of the battery.

In another aspect, the control circuitry comprises: a power conditioner that supplies the input voltage and the polarity of the thermoelectric device; and a local controller that adjusts the input voltage and the polarity based on the operating temperature of the battery.

In another aspect, a thermally conductive wrap is configured to contact against individual cells of the battery and conduct heat from the thermoelectric device to the individual cells when operating in the heating mode and conducts the heat from the individual cells to the thermoelectric device when operating in the cooling mode.

In another aspect, a sensor is configured to sense the temperature of the battery and transmit a corresponding signal to the control circuitry.

In another aspect, the control circuitry comprises a local controller and further comprises a system controller configured to receive a user input and to transmit a temperature setting point to the local controller.

In another aspect, the system controller determines whether the battery should be in one of capacity control mode and rate control mode.

In another aspect, the system controller is further configured to operate in an auto mode that switches between the capacity control mode and the rate control mode based on a load on the battery, and a manual temperature setting mode in which the temperature of the battery is set based on user input.

In another aspect, the control circuitry further comprises: a DC/DC converter; and an H-bridge to adjust a polarity of the input voltage of the thermoelectric device.

In another aspect, the thermoelectric device is configured to act in the heating mode in a first polarity and to act in the cooling mode in a second polarity.

One aspect is directed to a system for heating and cooling a battery for the battery to operate within a temperature range. The system comprises: a thermoelectric device that heats the battery when operated in a first polarity and that cools the battery when operated in a second polarity; a control unit comprising control circuitry configured to monitor a temperature of the battery and determine a temperature setting for the battery; control operation of the thermoelectric device between the first polarity and the second polarity and adjust a voltage supplied to the thermoelectric device to maintain the battery operating within the temperature range.

In another aspect, the control unit comprises: a power conditioner comprising a DC/DC converter and an H-bridge; and a local controller that receives signals from a sensor at the battery to monitor the temperature of the battery.

In another aspect, the thermoelectric device comprises an array of n-type and p-type semiconductor materials that are electrically and thermally connected together and positioned between opposing plates.

In another aspect, the control unit further comprises: a DC/DC converter; and an H-bridge to adjust the polarity of the thermoelectric device.

In another aspect, a system controller is located remotely from the control unit with the system controller comprising system control circuitry configured to: receive user input; based on the user input, determine when the battery should be in one of capacity control mode and rate control mode.

In another aspect, a thermally conductive wrap is configured to contact against individual cells of the battery and conduct heat from the thermoelectric device to heat the individual cells when operating in one of the polarities and conduct the heat from the individual cells to the thermoelectric device when operating in a second one of the polarities.

In another aspect, a power source provides power to the control unit.

One aspect is directed to a method of regulating a temperature of a battery with the method comprising: determining a temperature range for the battery; monitoring a temperature of the battery; when the temperature is below the temperature range, operating a thermoelectric device thermally connected to the battery in a first polarity and heating the battery; and when the temperature is above the temperature range, operating the thermoelectric device in a second polarity and cooling the battery.

In another aspect, the method comprises receiving user input and determining the temperature range based on the user input.

In another aspect, the method comprises determining an operating mode of the battery and determining the temperature range based on the operating mode.

In another aspect, the method comprises determining the temperature range for the battery based on whether operating in a rate-optimizing charging mode or a capacity-optimizing charging mode.

The features, functions and advantages that have been discussed can be achieved independently in various aspects or may be combined in yet other aspects, further details of which can be seen with reference to the following description and the drawings.

DETAILED DESCRIPTION

Figure 1:
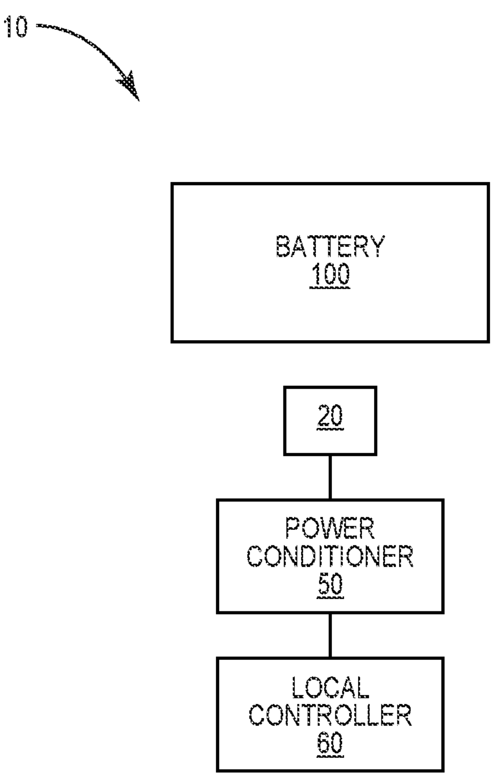
FIG. 1 is a schematic diagram of a system for controlling a temperature of a battery.

FIG. 1 schematically illustrates a system 10 for controlling a temperature of a battery 100. A thermoelectric device 20 is positioned to heat and/or cool the battery 100. A power conditioner 50 is operatively connected to the thermoelectric device 20. The power conditioner 50 regulates an input voltage and a polarity of the input voltage to the thermoelectric device 20. A local controller 60 determines a mode for the battery 100 and an operating temperature range. The local control 60 controls the power conditioner 50 to set the polarity and input voltage based on the need to cool or heat the battery 100 to operate within the temperature range.

Figures 2A, 2B:
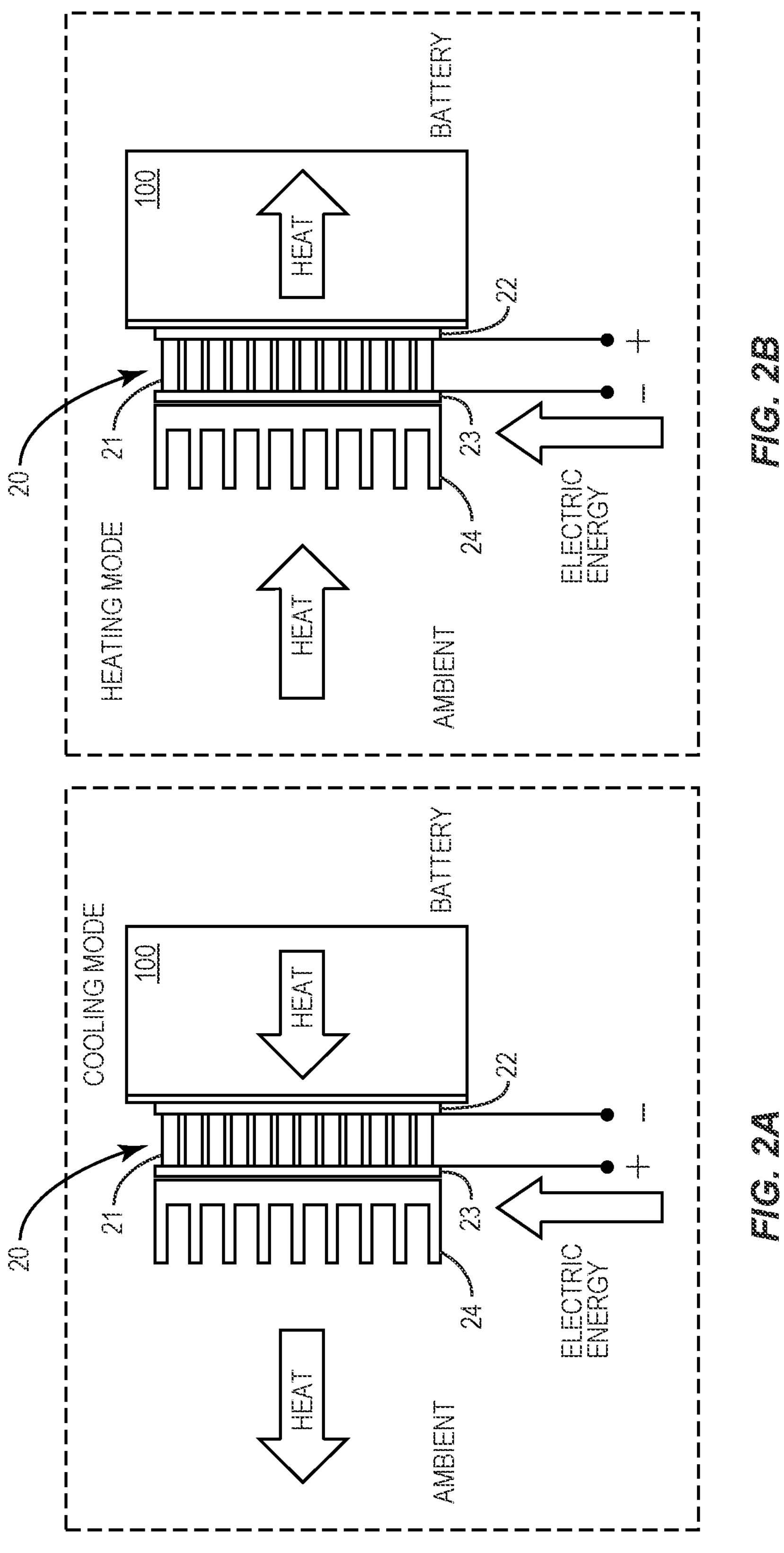
FIG. 2A is a schematic diagram of a thermoelectric device thermally connected to a battery and operating in a cooling mode.
FIG. 2B is a schematic diagram of the thermoelectric device of FIG. 2A operating in a heating mode.

The thermoelectric device 20 is positioned to heat or cool the battery 100. FIG. 2A illustrates an example of a thermoelectric device 20 that includes an array 21 of alternating n- and p-type semiconductors that are positioned between opposing plates 22, 23. In one example, the array 21 of semiconductors are soldered between the plates 22, 23 and are electrically in series and thermally in parallel. Examples of semiconductor materials include but are not limited to bismuth, telluride, and antimony telluride. During use, a voltage is applied across the plates 22, 23 to create an electric current. When current flows through the junctions of the two plates 22, 23, heat is removed at one junction and cooling occurs while heat is deposited at the other junction. A heat sink 24 that includes an exposed surface area such as fins can be attached to the outer plate 23 to further facilitate the heat transfer. In one example, the plates 22, 23 are ceramic.

FIG. 2A illustrates the thermoelectric device 20 operating in cooling mode to remove heat from the battery 100. The plate 22 is positioned in thermal contact with the battery 100. Electric energy is supplied to the plates 22, 23 thus causing heat from the battery 100 to be removed through the contact with the plate 22. The heat is then thermally conducted through the array 21 and to the plate 23 where it is released directly into the environment and/or through the heat sink 24.

The polarity of the supplied electric energy can be reversed for the thermoelectric device 20 to operate in a heating mode. As illustrated in FIG. 2B, the reversed polarity provides for heat to be collected at the plate 23 directly from the environment and/or through the heat sink 24. The heat is transferred through the array 21 and plate 22 to the battery 100.

Figure 3:
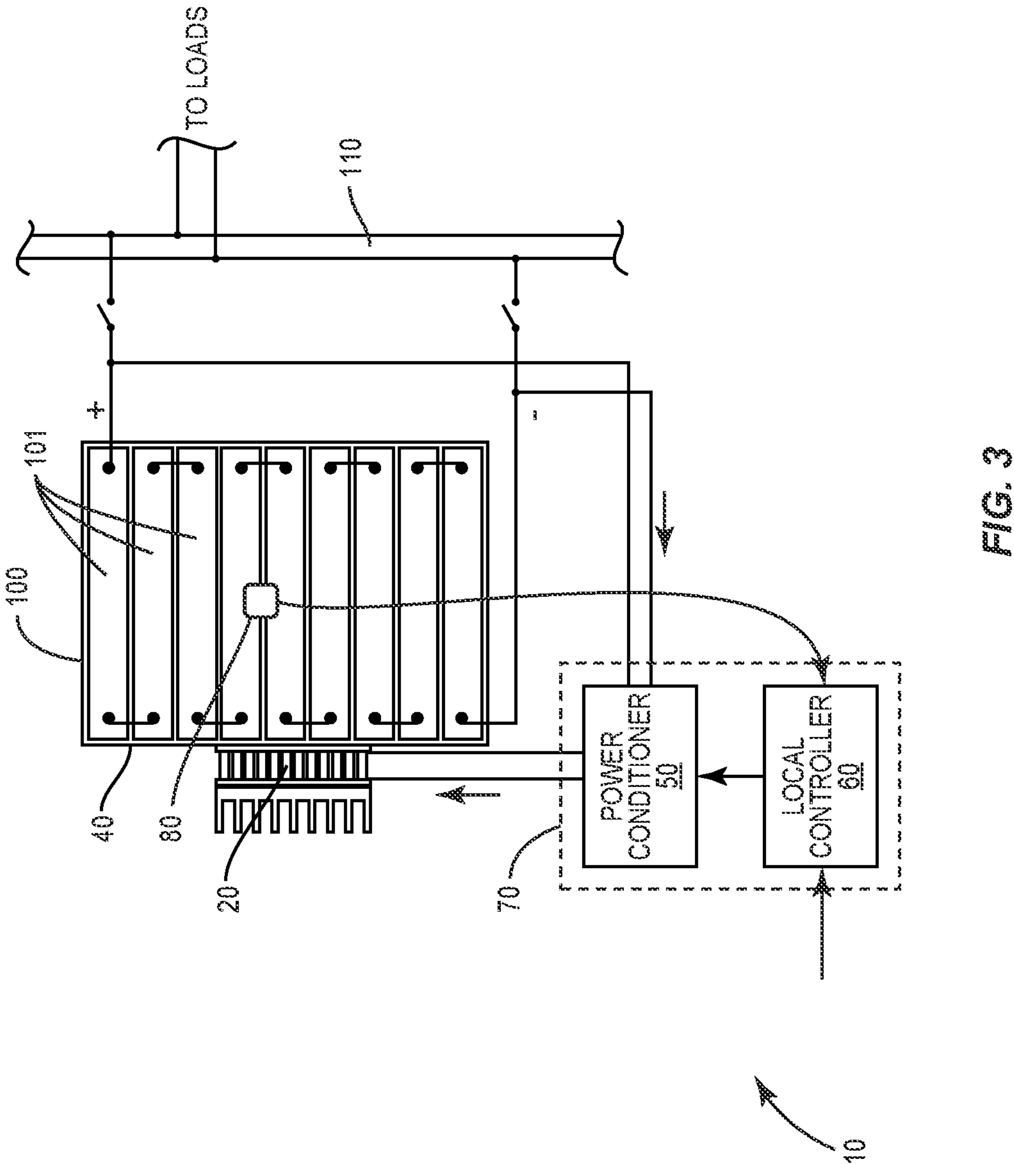
FIG. 3 is a schematic diagram of a system for controlling the temperature of a battery.

FIG. 3 illustrates an example of the system 10 connected to a battery 100 to control a temperature of the battery 100. In this example, the battery 100 includes a series of pouch or prismatic battery cells 101. In another example, the battery includes a series of cylindrical cells.

A wrap 40 is positioned on a portion or entirety of the battery 100. The wrap 40 is thermally conductive and provides for the transfer of heat. The wrap 40 can have a variety of constructions including but not limited to a pyrolytic graphite sheet and a carbon nanotube material. In one example as illustrated in FIG. 3, the wrap 40 snakes around and contacts against one or more of the surfaces of the cells 101. Additionally or alternatively, the wrap 40 extends around a portion or entirety of the exterior of the battery 100. The wrap 40 can be positioned against the thermoelectric device 20 or can be spaced away from the thermoelectric device 20.

The thermoelectric device 20 is positioned to heat and/or cool the battery 100. FIG. 3 includes the device 20 mounted on a side of the other, although the device 20 can be positioned at a variety of different locations relative to the battery 100.

The power conditioner 50 is electrically connected to the thermoelectric device 20. The power conditioner 50 regulates the magnitude of the input voltage supplied to the thermoelectric device 20. The power conditioner 50 also regulates the polarity of the input voltage to control the operational mode of the thermoelectric device 20 and whether it operates in heating mode to supply heat to the battery 100 or cooling mode to remove heat.

Figure 4:
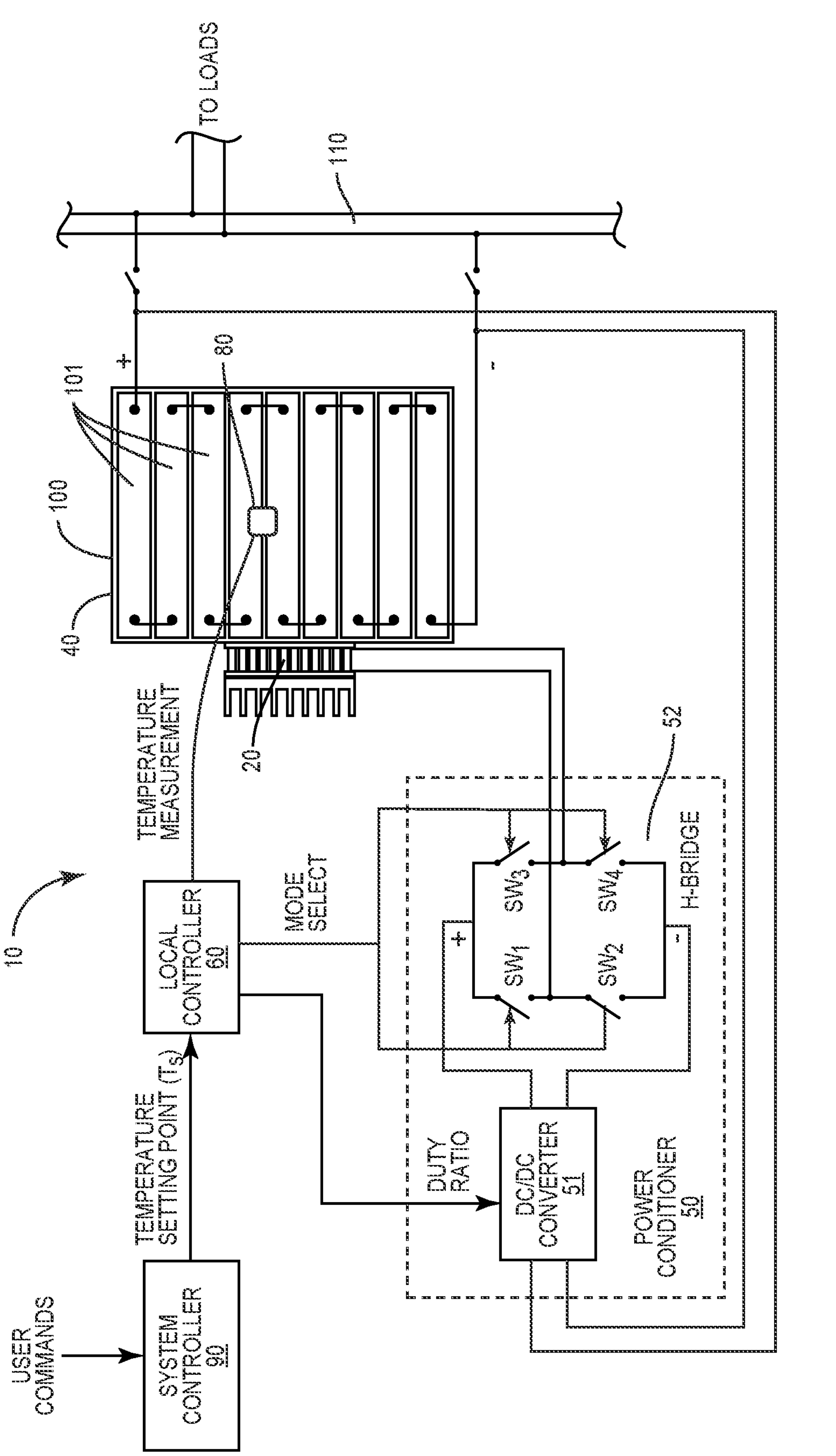
FIG. 4 is a schematic diagram of a system for controlling the temperature of a battery.

FIG. 4 includes an example with the power conditioner 50 having a converter 51. The converter 51 is a DC/DC converter that regulates the output voltage per duty ratio. The power conditioner 50 also includes a switcher 52 to vary the polarization of the voltage inputs to change the operational mode of the thermoelectric device 20. The switcher 52 includes an H-bridge with multiple switches that can be set to control the voltage output.

The local controller 60 determines whether the thermoelectric device 20 operates in the heating mode or the cooling mode. The local controller 60 also monitors the temperature of the battery 100 and maintains the temperature within a desired operating range to achieve increased performance of the battery 100. In one example, the local controller 60 receives an input indicating the operation of the battery 100 and thus determines the operating point to achieve the desired performance for charge or discharge rate, capacity, or both. The local controller 60 receives signals from a sensor 80 that is positioned to sense a temperature of the battery 100. This sensed temperature is used by the local controller 60 to operate the power conditioner 50 to remain within the desired temperature range.

The local controller 60 further uses the temperature of the battery 100 received from the sensor 80, and the inputs from the system controller 90 to calculate the operational commands for the thermoelectric device 20. The local controller 60 calculates the outputs the mode values and the duty ratio for operation of the thermoelectric device 20.

As illustrated in FIG. 4, a system controller 90 is positioned upstream from the local controller 60. The system controller 90 sends data to the local controller 60 for operation of the thermoelectric device 20. In one example, the system controller 90 sends a temperature setting point and an operational temperature range of the battery 100. The data can be stored at the system controller 90 in an autonomous system and/or received as input through user commands.

Figures 5A, 5B:
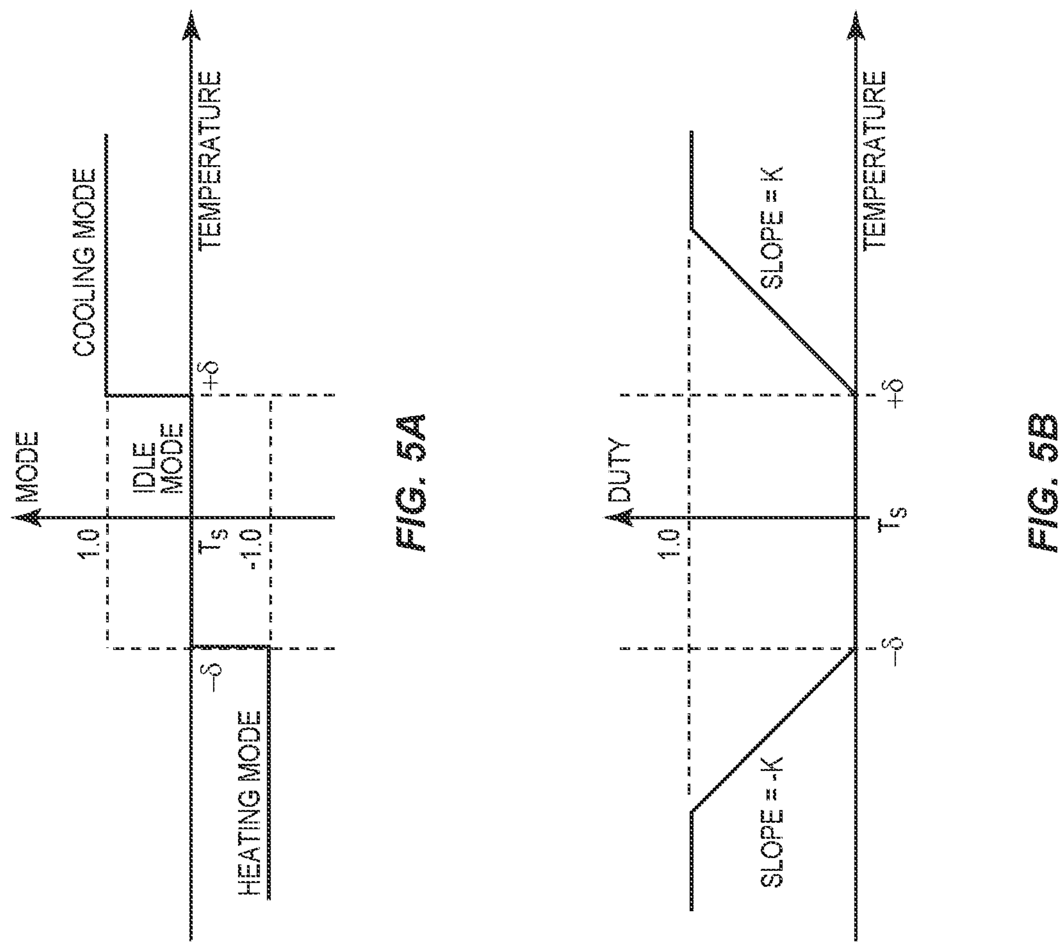
FIG. 5A is a schematic diagram of a determination of the mode values to set the operational mode of a thermoelectric device.
FIG. 5B is a schematic diagram of a determination of a duty ratio.

FIG. 5A schematically illustrates the determination of the mode values that are used to set the operational mode of the thermoelectric device 20. These calculations are based on the temperature setting point $T_s$, a temperature tolerance from the setting point cf, and the sensed temperature (Temp). One or both of the local controller 60 and system controller 90 calculates the mode using the following logic:

If Temp<$(T_s-d)$, then Mode=−1 (heating mode)

If $(T_s-d)$≤Temp≤$(T_s+d)$, then Mode=0 (idle mode−no heating or cooling)

If Temp>$(T_s+d)$, then Mode=1 (cooling mode)

FIG. 5B schematically illustrates the determination of the duty ratio calculated by one or both of the local controller 60 and the system controller 90. The determination sets the constant K for the slope of the duty ratio control. The duty ratio calculations include the following:

If Temp<$(T_s-d)$, then Duty=Abs[(Temp−$T_s$)*(−$K$)], with 0≤Duty≤1

If $(T_s-d)$≤Temp≤$(T_s+d)$, then Duty=0

If Temp>$(T_s+d)$, then Duty=Abs[($T_s$−Temp)*($K$)], with 0≤Duty≤1

Figure 6:
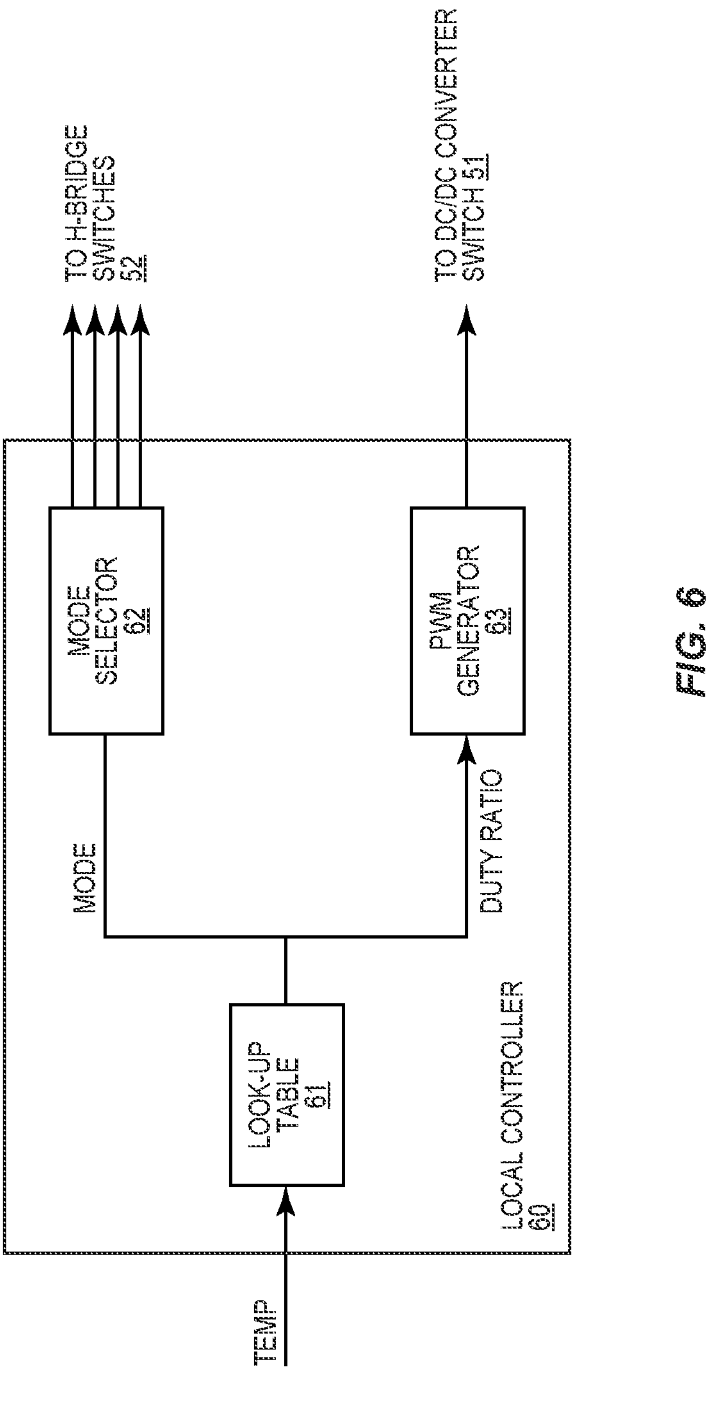
FIG. 6 is a schematic diagram of a local controller.

FIG. 6 illustrates a functional implementation diagram of the local controller 60. The local controller 60 receives as an input a temperature setting for the thermoelectric device 20. The local controller 60 includes a look-up table 61 that includes a duty ratio calculation and a mode selection for different temperature setting points. A mode selector 62 output signals to operates the switches of the H-bridge switcher 52. The mode selector 62 calculates the following:

If Mode=−1, then *SW*1 and *SW*4=ON, *SW*2 and *SW*3=OFF, working in heating mode If Mode=0, then *SW*1 to *SW*4=OFF, working in idle mode with no heating or cooling If Mode=1, then *SW*1 and *SW*$=OFF, *SW*2 and *SW*3=ON, working in cooling mode The local controller 60 also includes a pulse width modulation generator 63. PWM generator 63 provides a PWM signal that controls the converter 51 of the power conditioner 50 to regulate the output voltage per duty ratio value.

Figure 7:
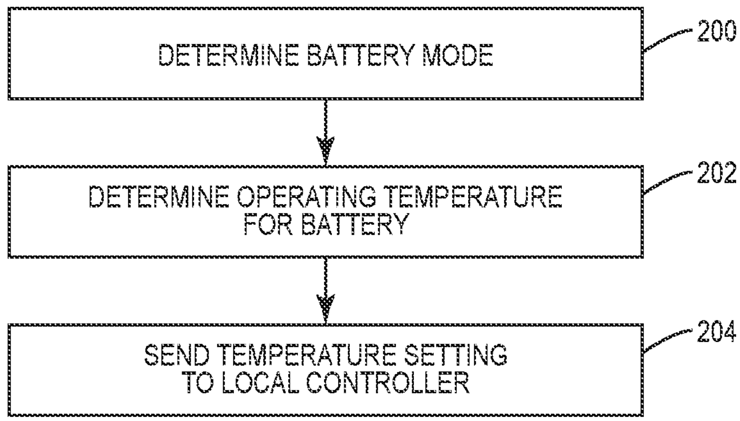
FIG. 7 is a flowchart diagram of a method of steps to control a temperature of a battery.

In one example, the system controller 90 determines when the battery 100 should operate in capacity control mode or in rate control mode. FIG. 7 illustrates a process by which the system controller 90 operates to control the temperature of the battery 100. The system controller 90 determines the battery mode (block 200). In one example, this is based on input from a user. In another example, the input is received from an upstream controller that monitors a larger overall process. In another example, the battery mode is determined by the system controller 90 based on sensed data including but not limited to amount of charge remaining in the battery 100, current charge demand on the battery 100, and the time since last recharging.

The system controller 90 determines the operating temperature for the battery 100 (block 202). For a capacity control mode, the system controller 90 calculates the setting temperature as $T_s=T_c$+/−$\hat{d}_c$ with $T_c$ being an optimum operating temperature and do being the variations above and below that define the allowable operating range. For rate control mode, the system controller 90 calculates the setting temperature as $T_s=T_r$+/−$\hat{d}_r$, with $T_r$ being the optimum temperature and dr being the variations above and below that define the operating range. Once calculated, the system controller 90 sends the temperature setting to the local controller 60 (block 204).

Upon receiving the setting temperatures, the local controller 60 compares the temperature setting to the measured real temperature of the battery 100 and commands the thermoelectric device 20 to cool or heat as necessary.

The number of operational modes of the battery 100 can vary. One example includes two operational modes including a capacity control mode and a rate control mode. Another example includes three operational modes include capacity control mode, rate control mode, and an auto mode that switches between capacity control mode and rate control mode depending upon the demands on the battery 100.

The auto mode operates in both the capacity control mode and the rate control mode based on the mode in which the battery 100 is operating. During the auto mode when the battery 100 is being charged from an external source, the system controller 90 initially operates in the rate control mode during high speed charging of the battery 100 to save charging time, and then switches to capacity control mode during battery low speed charging phase to maximize charging capacity. One example includes a constant current-constant voltage charging method for charging a lithium rechargeable battery. Constant current (CC) is the high speed charging phase, and constant voltage (CV) is the low speed charging phase. The method first performs CC charging before the battery voltage reaches a predetermined value, and then switches to CV until charging current decreases to a setting point.

During the auto mode when the battery 100 is in a discharging phase to serve a load, the system controller 90 first sets the mode as capacity control mode. During the capacity control mode, the system controller 90 senses the load characteristics. If the load shows frequently high current discharge pulses, then the system controller 90 will switch to the rate control mode. Later if the load shows less frequency of high current discharge, then the system controller 90 will switch back to the capacity control mode.

The system controller 90 can also provide for a manual mode. The manual mode includes receiving the temperature setting from the user. In one example, the input includes a specific temperature setting and the system controller 90 determines a range (i.e., +/−d). In another example, the user input includes a range of temperatures.

Figure 8:
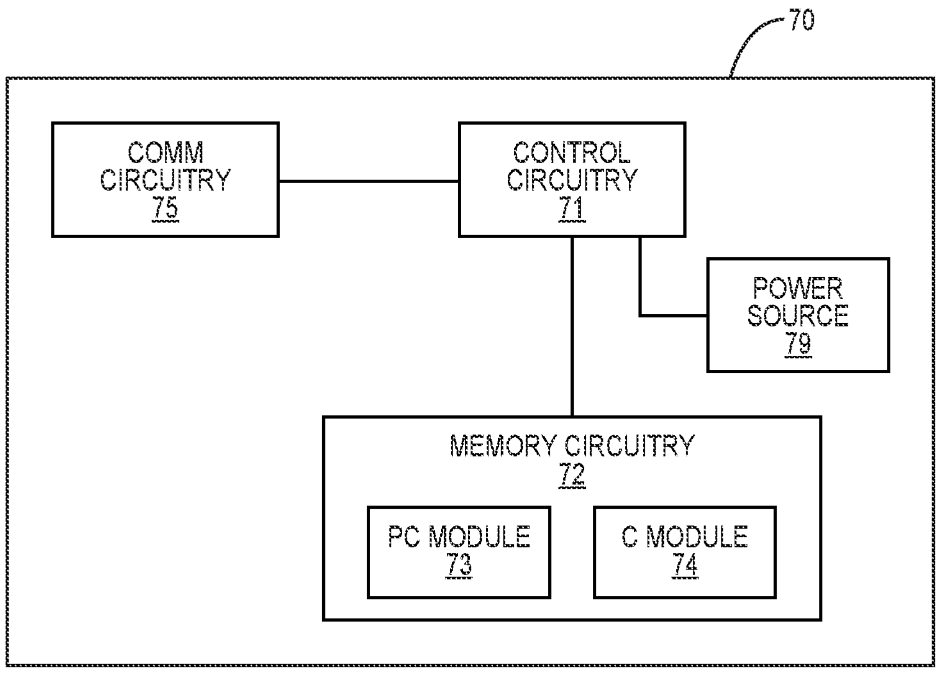
FIG. 8 is a schematic diagram of a control unit.

In one example, the power conditioner 50 and the local controller 60 are incorporated into a control unit 70. As illustrated in FIG. 8, the control unit 70 includes control circuitry 71 and a memory circuitry 72. The control circuitry 71 controls overall operation of the system 10 according to program instructions stored in the memory circuitry 72. The control circuitry 71 can include one or more circuits, microcontrollers, microprocessors, hardware, or a combination thereof. Memory circuitry 72 includes a non-transitory computer readable storage medium storing program instructions, such as a computer program product, that configures the control circuitry 71 to implement one or more of the techniques discussed herein. Memory circuitry 72 can include various memory devices such as, for example, read-only memory, and flash memory. In one example, a power condition PC module 73 can include instructions for operation of the power conditioner 50 and a controller C module 74 can include instructions for operation of the controller 60. Other examples include common modules for operation of these components. In another example, the control circuitry 71 can omit the memory circuitry 72, e.g., according to at least some embodiments in which the control circuitry 71 is dedicated and non-programmable.

Communication circuitry 75 provides for receiving one or more inputs for operation of the system 10. Inputs can include but are not limited to inputs regarding operation of the battery 100, temperatures inputs, and user commands.

In another example (not illustrated), the power conditioner 50 and the controller 60 are separate. Each includes control circuitry and memory circuitry and is configured to provide for operation of their specific component. Power may be supplied to operate one or more of the power conditioner 50, controller 60, and control unit 70. The power can be supplied from one or more of the battery 100 and a power bus 110, such as a DC bus, to which the battery 100 is electrically connected. In another example, one or more of the components are powered by a separate power source 79, such as a battery.

In one example, the system 10 includes a single thermoelectric device 20 to heat and/or cool the battery 100. Other examples can include two or more thermoelectric devices 20 positioned to heat and/or cool the battery 100. The thermoelectric devices 20 can be the same or different.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to heat and cool a battery for the battery to operate within a temperature range, the system comprising:

a thermoelectric device configured to attach to the battery and operate in a heating mode to elevate an operating temperature of the battery and in a cooling mode to reduce the operating temperature of the battery;

control circuitry comprising:

a power conditioner that regulates an input voltage supplied to the thermoelectric device and regulates a polarity of the input voltage to control an operational mode of the thermoelectric device, the power conditioner comprising:

a converter that regulates an output voltage per duty cycle;

switches to change an operational mode of the thermoelectric device;

a system controller configured to:

receive a user input of a temperature setting point;

determine when the battery is in one of the following modes:

a capacity control mode to maximize charging capacity;

a rate control mode for high speed charging; and an auto mode that switches between the capacity control mode and the rate control mode based on a load on the battery;

a local controller that receives the temperature setting point for the thermoelectric device from the system controller, the local controller comprising:

a mode selector that outputs signals to operate the switches to change the operational mode of the thermoelectric device; and a modulation generator that controls the power conditioner to regulate the output voltage per duty ratio;

wherein one or both of the power conditioner and the local controller are powered by the battery.

2. The system of claim 1, further comprising a thermally conductive wrap configured to extend between and contact against individual cells of the battery and conduct heat from the thermoelectric device to the individual cells when operating in the heating mode and conduct the heat from the individual cells to the thermoelectric device when operating in the cooling mode, wherein the wrap is spaced away from the thermoelectric device.

3. The system of claim 1, further comprising a sensor configured to sense the temperature of the battery and transmit a corresponding signal to the control circuitry.

4. The system of claim 1, wherein:

the converter comprises a DC/DC converter; and the switches comprise an H-bridge to adjust a polarity of the input voltage of the thermoelectric device.

5. The system of claim 1, wherein the thermoelectric device is configured to act in the heating mode in a first polarity and to act in the cooling mode in a second polarity.

6. A system to heat and cool a battery for the battery to operate within a temperature range, the system comprising:

a thermoelectric device that heats the battery when operated in a first polarity and that cools the battery when operated in a second polarity;

a system controller configured to receive a temperature setting point from a user through a user input, the system controller further configured to:

determine when the battery is in one of the following:

a capacity control mode to maximize charging capacity;

a rate control mode for high speed charging; and an auto mode that switches between the capacity control mode and the rate control mode based on a load on the battery;

a control unit comprising control circuitry configured to:

monitor a temperature of the battery;

receive the temperature setting point for the battery;

control operation of the thermoelectric device between the first polarity and the second polarity and adjust a voltage supplied to the thermoelectric device to maintain the battery operating within a temperature tolerance;

wherein the control unit operates the thermoelectric device in a heating mode when the temperature is less than a difference between the temperature setting point and the temperature tolerance; and wherein the control unit operates the thermoelectric device in a cooling mode when the temperature is greater than a sum of the temperature setting point and the temperature tolerance; and wherein the temperature tolerance is calculated by one or both of the system controller and the local controller.

7. The system of claim 6, wherein the control unit comprises:

a power conditioner comprising a DC/DC converter and an H-bridge; and a local controller that receives signals from a sensor at the battery to monitor the temperature of the battery.

8. The system of claim 6, wherein the thermoelectric device comprises an array of n-type and p-type semiconductor materials that are electrically and thermally connected together and positioned between opposing plates.

9. The system of claim 6, wherein the control unit further comprises:

a DC/DC converter; and an H-bridge to adjust a polarity of the thermoelectric device.

10. The system of claim 6, further comprising the system controller located remotely from the control unit, the system controller comprising system control circuitry configured to:

receive the user input; and based on the user input, determine when the battery is in one of the capacity control mode, the rate control mode, and the auto mode.

11. The system of claim 6, further comprising a thermally conductive wrap configured to contact against individual cells of the battery and conduct heat from the thermoelectric device to heat the individual cells when operating in one of the first and second polarities and conduct the heat from the individual cells to the thermoelectric device when operating in a second one of the polarities wherein the wrap is spaced away from the thermoelectric device.

12. The system of claim 1, further comprising a heat sink connected to thermoelectric device, the heat sink comprises an exposed surface area that faces away from the battery.

13. The system of claim 1, wherein the thermoelectric device operates in a heating mode when the temperature is less than a difference between the temperature setting point and a temperature tolerance, and wherein the thermoelectric device operates in a cooling mode when the temperature is greater than a sum of the temperature setting point and the temperature tolerance.

14. The system of claim 13, wherein the thermoelectric device operates in an idle mode when the temperature is greater than a difference between the temperature setting point and the temperature tolerance and less than a sum of the temperature setting point and the temperature tolerance.

15. The system of claim 6, further comprising a heat sink connected to thermoelectric device, the heat sink comprises an exposed surface area that faces away from the battery.

16. The system of claim 6, wherein the control unit operates the thermoelectric device is an idle mode when the temperature is greater than a difference between the temperature setting point and the temperature tolerance and less than a sum of the sensed temperature and the temperature tolerance.

17. The system of claim 11, wherein the wrap extends around and contacts one or more surfaces of cells of the battery.

18. The system of claim 1, wherein the thermoelectric device comprises an array of n-type and p-type semiconductor materials that are electrically and thermally connected together and positioned between opposing plates.

19. The system of claim 1, wherein the temperature setting point is a first user input and wherein control circuitry is configured to determine the mode of the battery based on a second user input.

20. The system of claim 1, wherein the mode of the battery is determined based on an amount of charge remaining in the battery.

* * * * *